United States Patent
Shah et al.

(10) Patent No.: US 8,127,174 B1
(45) Date of Patent: Feb. 28, 2012

(54) METHOD AND APPARATUS FOR PERFORMING TRANSPARENT IN-MEMORY CHECKPOINTING

(75) Inventors: Veeral Shah, Maharashtra (IN); Milind Borate, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 1794 days.

(21) Appl. No.: 11/068,016

(22) Filed: Feb. 28, 2005

(51) Int. Cl.
*G06F 11/00* (2006.01)

(52) U.S. Cl. .......................................... 714/13

(58) Field of Classification Search .............. 714/6, 13
See application file for complete search history.

(56) References Cited

U.S. PATENT DOCUMENTS

| | | | |
|---|---|---|---|
| 5,634,096 A * | 5/1997 | Baylor et al. | 714/6 |
| 5,845,292 A * | 12/1998 | Bohannon et al. | 707/202 |
| 5,893,155 A * | 4/1999 | Cheriton | 711/144 |
| 5,933,593 A * | 8/1999 | Arun et al. | 714/6 |
| 5,951,695 A * | 9/1999 | Kolovson | 714/16 |
| 5,996,088 A * | 11/1999 | Frank et al. | 714/6 |
| 6,631,480 B2 * | 10/2003 | Zeigler et al. | 714/20 |
| 6,988,165 B2 * | 1/2006 | White et al. | 711/113 |
| 7,065,540 B2 * | 6/2006 | Chandrasekaran et al. | 707/203 |
| 7,904,906 B2 * | 3/2011 | Puthukattukaran et al. | 718/102 |
| 2002/0116555 A1* | 8/2002 | Somers et al. | 710/26 |

* cited by examiner

*Primary Examiner* — Amine Riad
(74) *Attorney, Agent, or Firm* — Campbell Stephenson LLP

(57) ABSTRACT

A method and apparatus for performing transparent checkpoint data backup by identifying portions of memory that store the checkpoint data that have been modified since a prior in-memory checkpoint process and backing up only the identified portions of memory containing the modified checkpoint data.

21 Claims, 5 Drawing Sheets

METHOD AND APPARATUS FOR PERFORMING TRANSPARENT IN-MEMORY CHECKPOINTING

BACKGROUND OF THE INVENTION

1. Field of the Invention

Embodiments of the present invention generally relate to data storage systems and, more particularly, to a method and apparatus for performing backup storage of checkpoint data.

2. Description of the Related Art

Modern computer networks generally comprise a plurality of user computers connected to one another and to a computer server via a communications network. To provide redundancy and high availability of information and applications that are executed upon a computer server, multiple computer servers may be arranged in a cluster, i.e., forming a server cluster. Such server clusters are available under the trademark VERITAS CLUSTER SERVER from Veritas Software Corporation of Mountain View, Calif. In a server clusters, the plurality of servers communicate with one another to facilitate failover redundancy such that when software or hardware (i.e., computer resources) become inoperative on one server, another server can quickly execute the same software that was running on the inoperative server substantially without interruption. As such, a user of services that are supported by a server cluster would not be substantially impacted by an inoperative server or software.

To facilitate the substantially seamless transition of user service to another server within the server cluster, the production server, i.e., the server that is presently supporting users of the server services, stores checkpoint data in random access memory (RAM). This checkpoint data is essentially the data being used by software at particular times as well as the server state at those particular times. The backup software within the production server takes a "snapshot" of the data and the server state, then stores that information as checkpoint data. To create redundancy, the checkpoint data is remotely stored on a backup server, i.e., another server in the server cluster. Upon failure of the software or production server, the software is booted on the backup server and the checkpoint data can be used to start the software at approximately the position within the software where the failure occurred.

Upon failover, the backup server becomes the production server from the view of the user without substantial interruption of software utilization. Thus, upon failover to the backup server, the software is executed from the last saved state which can then use the stored data related to that saved state.

The checkpoint data is repeatedly stored to the backup servers on a periodic basis such that a large amount of checkpoint data may be accumulated. Additionally, with each backup procedure, all of the available checkpoint data is replicated to the back up server or servers. Because of a large amount of checkpoint data is available at each backup, such checkpoint data backup may be time consuming and require a large amount of storage. It would be advantageous to reduce the amount of checkpoint data that must be backed up to facilitate failover.

Therefore, there is a need in the art for a method and apparatus for improving the checkpoint data backup process.

SUMMARY OF THE INVENTION

The embodiments of the present invention are generally directed to a method and apparatus for backing up checkpoint data, using a File System or device driver to track the modified data, such that only modified checkpoint data is backed up. The invention identifies the modified data without interaction with the application programs, such that the backup process is transparent to the application programs that create the checkpoint data.

In one embodiment, the application maps a memory region in its address space onto a file or an operating system (OS) device. Upon performing the memory map function, the file system is used to monitor page parameters to identify pages that have been modified since the last execution of checkpoint process. For example, one such parameter is that the modified page has the "page dirty" bit set. Alternatively, the pages in the memory region can be set to read-only, then, with each write request, a page fault is generated for pages marked read only and pages that are not present in the memory. The file system monitors the page faults to identify each page that has been modified. In this manner, when the checkpoint data is to be backed up, only the pages that have been modified (including changed pages and new pages) are backed up and replicated to one or more backup servers.

In a second embodiment of the invention, the invention tracks dirty blocks when the modified pages are passed to the file system or a device driver for writing the pages to a secondary storage. The modified pages can then be replicated to one or more backup systems.

Using either embodiment of the invention, the amount of checkpoint data to be backed up is reduced such that the backup process is faster and the amount of storage used for the backup is reduced.

BRIEF DESCRIPTION OF THE DRAWINGS

The following detailed description makes reference to the accompanying drawings which are now briefly described.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must).

Similarly, the words "include," "including," and "includes" mean including, but not limited to.

DETAILED DESCRIPTION OF THE INVENTION

Figure 1:
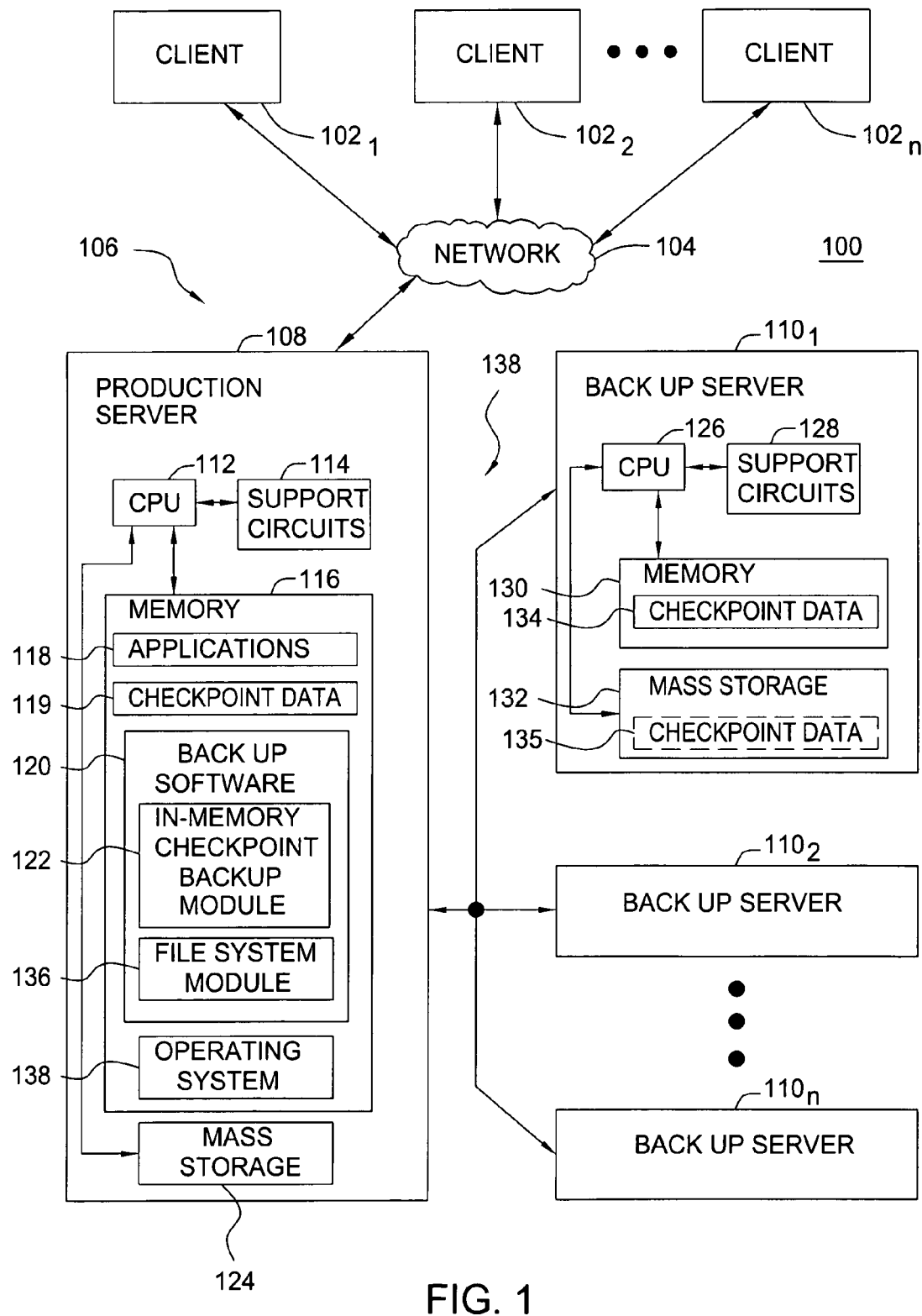
FIG. 1 is a block diagram of a computer network having a server cluster that operates in accordance with the present invention.

FIG. 1 depicts a computer network 100 in which one embodiment of the present invention may be utilized. The invention, as shall be discussed below, is a method and apparatus for backing up checkpoint data that is created in a production server 108, using a File System or device driver to track the modified data such that only modified checkpoint data is backed up to one or more backup servers $110_1$, $110_2$, $110_3$.... As such, by storing the checkpoint data on more than one server, the checkpoint data is stored in a redundant, fault-tolerant manner.

The computer network 100 comprises a plurality of client computers $102_1$, $102_2$ ... $102_n$ that are connected to a network 104. The client computers 102 may contain one or more individual computers, wireless devices, personal digital assistants, desktop computers, laptop computers or any other digital device that may benefit from connection to a computer network.

The computer network 104 is a conventional computer network which may be an Ethernet network, a fiber channel network and the like. The client computers 102 may be connected to a server cluster 106 through a firewall, a router, or some form of switch (not shown). The server cluster 106 generally comprises multiple servers 108, $110_1$, $110_2$, ... $110_n$ that are interconnected to one another by a server cluster network 138. Although the servers within the server cluster 106 may be identical, one of the servers will be operating to service particular clients (users) at any particular time. This server is identified as the production server 108 while all other servers $110_1$, $110_2$ ... $110_n$ are deemed backup servers vis-à-vis the production server 108. All the servers 108, $110_1$, $110_2$ ... $110_n$ may be referred to as nodes of the server cluster 106. Although one server cluster 106 is depicted in FIG. 1, those skilled in the art will realize that many server cluster benefiting from the invention can be connected to the computer network 104. Such a server cluster 106 may be a VERITAS CLUSTER SERVER available from Veritas Software Corporation of Mountain View, Calif.

The production server 108 generally includes at least one central processing unit (CPU) 112, support circuits 114 and memory 116. Additionally, the production server 108 may contain mass storage 124 or the server 108 may be connected to a common mass storage system (not shown) that is shared by a plurality of servers. The CPU 112 may include one or more commercially available processors. The support circuits 114 are well known circuits that include cache, power supplies, clocks, input/output interface circuitry, and the like.

The memory 116 may include random access memory, read only memory, removable disk memory, flash memory, and various combinations of these types of memory. The memory 116 is sometimes referred to as main memory and may in part be used as cache memory. The memory 116 stores checkpoint data 119, an operating system 138, and may store various software applications such as application software 118 and backup software 120. In one embodiment of the invention, the backup software 120 further comprises a checkpoint data backup module 122 and a file system module 136. In other embodiments of the invention, modules 122 and 136 may be stored and executed by a backup server 100 or a specialized computer (not shown) that is solely used to coordinate backup of the checkpoint data 119.

The backup software 120 is used to insure that the checkpoint data 119 as well as other data that is stored in the production server 108 is sent to one or more of the backup servers $110_1$, $110_2$ ... $110_n$ for remote storage from the production server 108. Such backup software 120 insures that the production server 108 is fault tolerant such that a failure of the production server 108 will quickly be compensated by one or more of the backup servers $110_1$, $110_2$ ... $110_n$. The checkpoint data backup module 122 stores checkpoint data 119 at various points during execution of the application software. As one or more applications 118 are being executed by the production server 108, the checkpoint data backup module 122 will intermittently save the state information of the application as well as data that is used by the application at that point in time. In this manner, the state and data are related at the particular point in time that the checkpoint data is stored. The invention, as will be described in more detail below, processes the checkpoint data such that only modified checkpoint data is replicated for backup storage.

Each backup server $110_1$, $110_2$ ... $110_n$ comprises a CPU 126, support circuits 128, memory 130 and mass storage device 132. As discussed previously, the mass storage device 132 may be a mass storage system that supports a plurality of the backup servers 110. The checkpoint data 134 is stored in, for example, the memory 130 for recall and use when the production server 108, corresponding to that checkpoint data, fails. Upon failover, the backup servers $110_1$, $110_2$ ... $110_n$ cooperate to execute the applications that were running on the production server from the server state indicated by the checkpoint data. By storing the checkpoint data 134 in the memory 130, the checkpoint data 134 may be recalled and used quickly by the backup server 110. Alternatively, the checkpoint data 134 can be stored upon the mass storage device 132, e.g., a disk drive or disk drive array, as indicated by the dashed box.

To facilitate communications within the server cluster, the backup servers and the production server are interconnected by, for example, a private network 138. The private network 138 facilitates redundant use of the servers by providing communications between each of the servers within the server cluster 106. As such, the failover process is coordinated amongst the servers in the cluster via the network 138.

Figure 2:
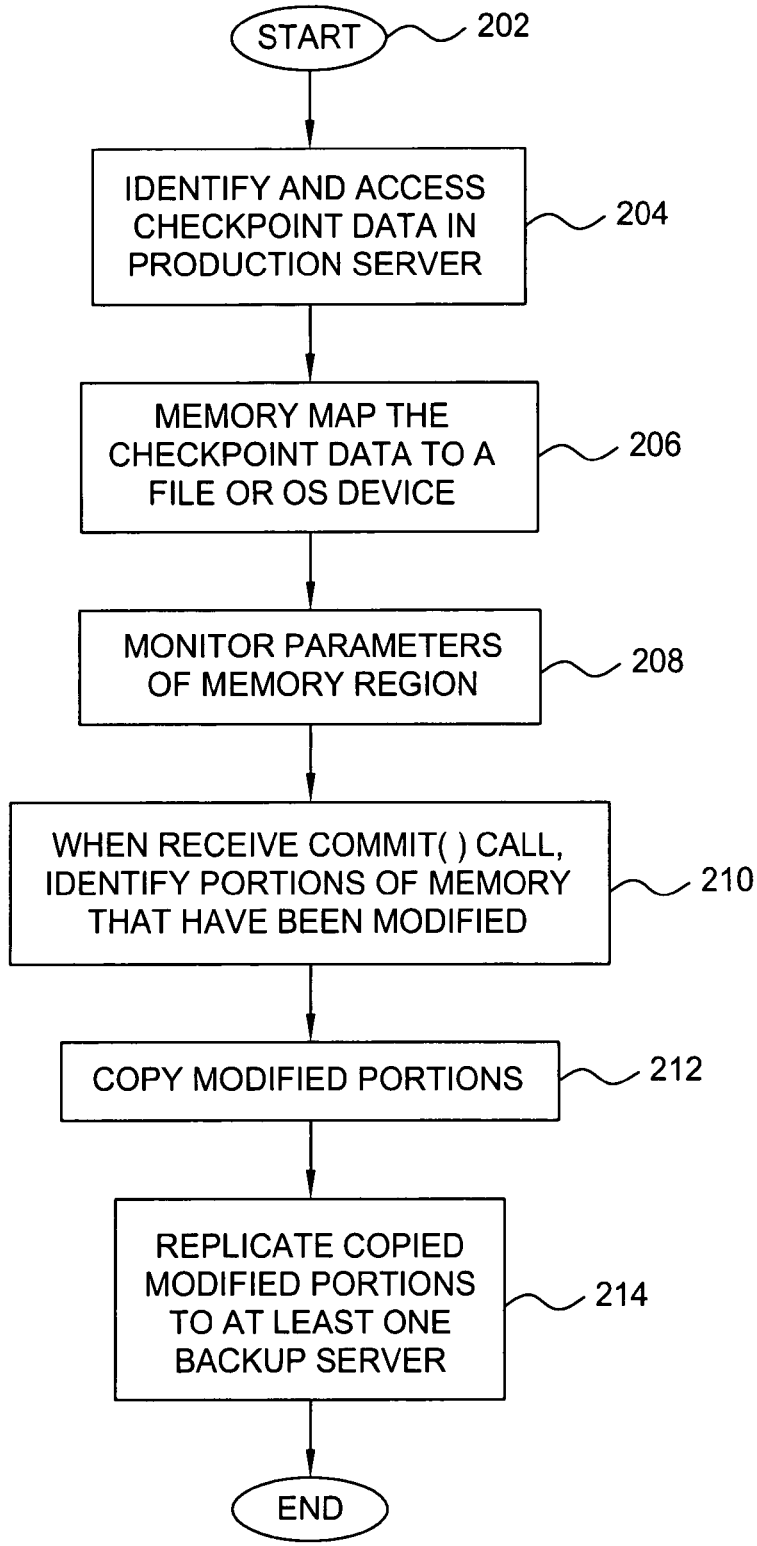
FIG. 2 depicts a flow diagram of a method of backing up checkpoint data in accordance with a first embodiment of the present invention.

FIG. 2 depicts a flow diagram of a method 200 of operation for the checkpoint data backup module 122 in accordance with a first embodiment of the invention. Method 200 is used to backup changes in checkpoint data. It is assumed that an initial backup of all the checkpoint data has already occurred and method 200 is executed to backup checkpoint data modifications that occur since the prior backup process. The modifications include both changes to existing pages in memory and new pages that are added.

The in-memory checkpoint method 200 starts at step 202 and proceeds to step 204, wherein the method 200 identifies and accesses the checkpoint data in the production server. Generally, the checkpoint data is stored in random access memory within the production server. At step 206, the checkpoint data in memory is mapped to at least one of a file or an operating system (OS) device. The file or OS device is herein generally referred to as a memory region.

With each execution of the checkpoint process, the method 200 transparently determines the portions (e.g., pages and blocks) of memory in the memory region, which is memory mapped to a file or an OS device that have been modified since the previous execution of the checkpoint process. In accordance with the invention, only the modified portions are backed up. The method 200 may also track the thread and process that generated the modification such that backups can be performed on a thread or process basis.

In one specific embodiment, at step 208, the method 200 monitors parameters of the memory region. Generally, the file system has access to various parameters that define attributes of the pages in memory. Some of these parameters indicate whether a page has been modified. For example, a modified page may have a "page dirty" bit that can be monitored by the method 200 via the file system. Another way to identify page modifications is to set the page as read-only when memory mapping occurs for the first time. Thereafter, when a page is written, the file system receives a page fault and the method 200 tracks the faulted pages.

At step 210, in response to receiving a commit ( ) call generated by an application, where the commit ( ) call initiates the backup process for the checkpoint data, the method 200 identifies the pages within the mapped memory region that have been modified. This identification can be performed by either reading a list of pages with "dirty page" bits set or by reading a list of pages having page faults.

At step 212, the modified pages that were identified in step 210 are copied and, at step 214, the copied pages are asynchronously replicated to one or more of the back up servers. The replication may be performed in accordance with the method described in U.S. patent application Ser. No. 10/812,139, filed Mar. 29, 2004, and incorporated herein by reference. Other methods of replication are known in the art and may be used. Before the commit ( ) call returns to the application that initiated the in-memory checkpoint process, the method 200 sets the pages in the mapped memory region to read-only (this is only performed in the method that uses write access tracking based upon page faults). As such, any new write access to these pages will be tracked as modifications to be backed up during the next execution of method 200.

The method 200 can also support a per thread commit ( ) call where all the pages modified by a particular thread are replicated. Additionally, replication can be limited to certain processes that created the modification to the page such that per process replication can be used. In another embodiment, all the modified pages are replicated irrespective of the thread or process that performed the modification. Each of these embodiments; thread-based, process-based or all, may have different forms of commit ( ) calls that initiate the desired type of replication.

The method 200 ends at step 216.

Figure 3:
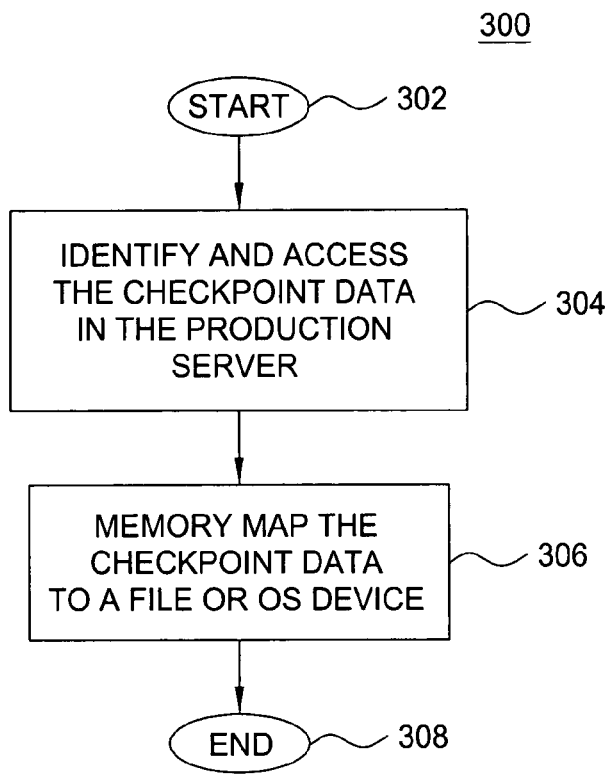
FIG. 3 depicts a flow diagram of a first component of a method of backing up checkpoint data in accordance with a second embodiment of the present invention.

FIG. 3 depicts a flow diagram of a method 300 of operation for a first component of the checkpoint data backup module 122 in accordance with a second embodiment of the invention.

The method 300 asynchronously starts at step 302 and proceeds to step 304, wherein the method 300 identifies and accesses the checkpoint data in the production server. Generally, the checkpoint data is stored in random access memory within the production server. At step 306, the checkpoint data is memory, mapped to a file or an OS device (herein referred to generally as a memory region). The method 300 ends at step 308. The method 300 is typically executed on a periodic basis to prepare the checkpointed data for backup.

Figure 4:
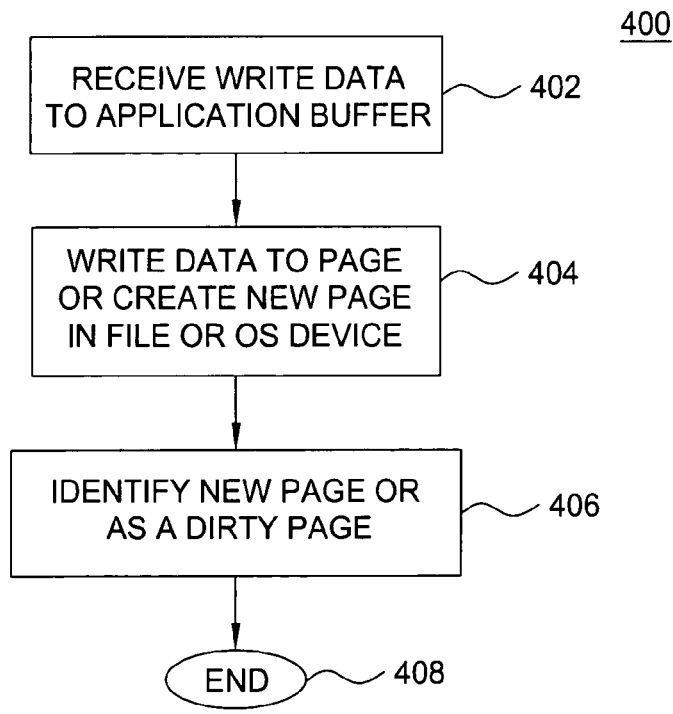
FIG. 4 depicts a flow diagram of a second component of a method of backing up checkpoint data in accordance with a second embodiment of the present invention.

At some time after each execution of method 300, the method must transparently determine which portions of the memory region have been modified since the last backup. FIG. 4 depicts a method 400 for identifying pages that have been modified. This routine forms a second component of the checkpoint data backup module 122. In the specific embodiment, at step 402, the method 400 is executed when the application writes checkpoint data to the memory region. Since the application buffer is memory mapped to a file or OS device, a formal write request does not need to be used.

Instead, the application writes to the application buffer using a simple pointer access. When the data is written to the buffer, method 400 is executed.

At step 404, the data written to the buffer is written to the memory region, which changes the content of a page or creates a new page if the page does not exist. At step 406, the method 400 identifies the modified pages (new pages and/or changed pages) as dirty pages. The method 400 ends at step 408. This method 400 is executed with each write request. As such, dirty pages are continuously identified.

Figure 5:
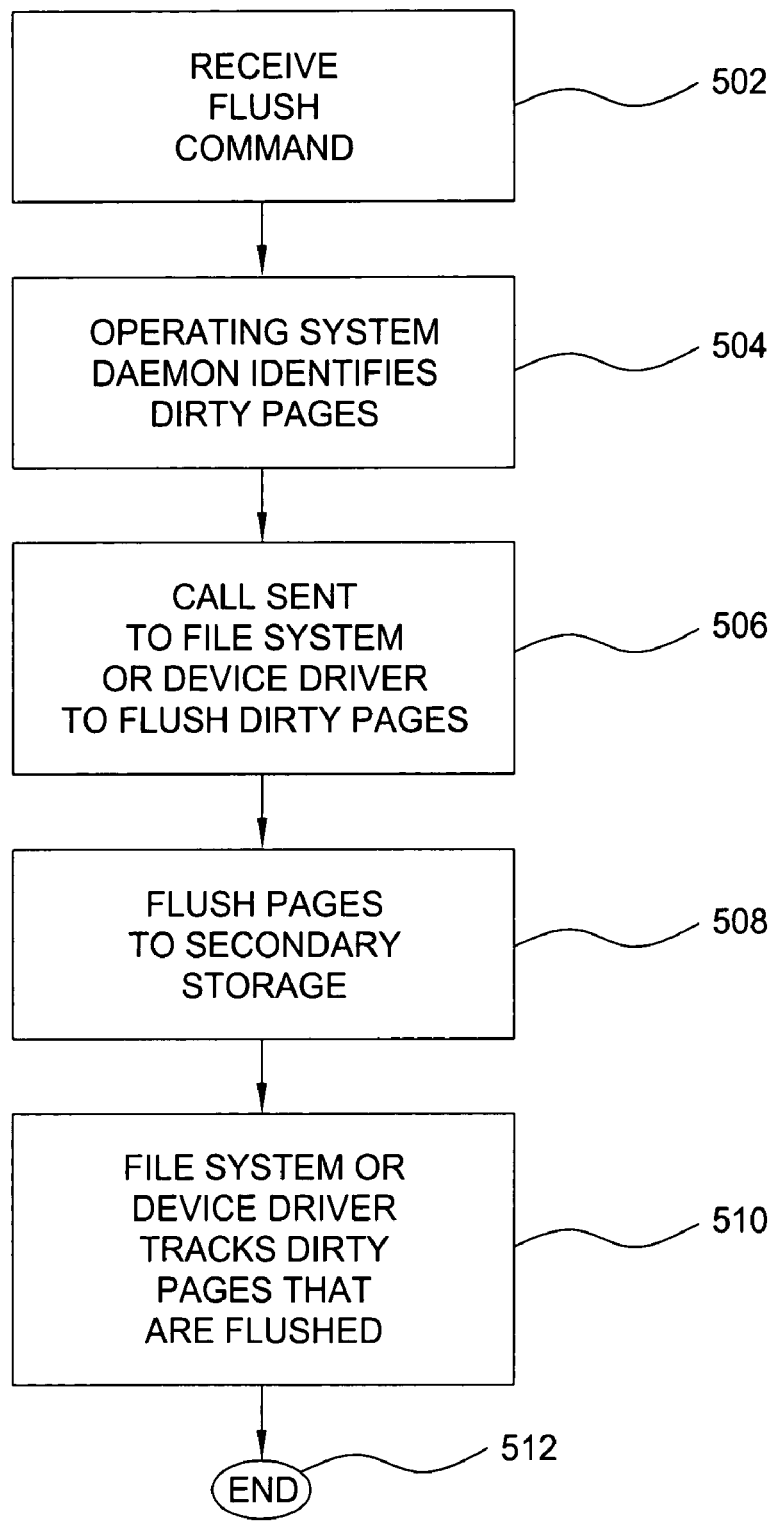
FIG. 5 depicts a flow diagram of a third component of a method of backing up checkpoint data in accordance with a second embodiment of the present invention.

Asynchronously, the operating system will issue a memory flush command to copy (flush) dirty pages from a main memory to a secondary storage. The method 500 in FIG. 5 performs this function while tracking the dirty pages that are flushed in accordance with the present invention. The method 500 forms a third component of the checkpoint data backup module 122. At step 502, a flush command is received by the operating system daemon. At step 504, the operating system daemon identifies the dirty pages as produced in step 406 of FIG. 4. At step 506, the operating system issues a call to the file system or a device driver to flush the identified dirty pages. At step 508, the dirty pages are flushed to secondary storage. At step 510, the file system and/or device driver tracks the dirty pages that were flushed, i.e., maintain a list. As such, the location of these dirty pages in secondary memory is known. The method 500 ends at step 512.

Figure 6:
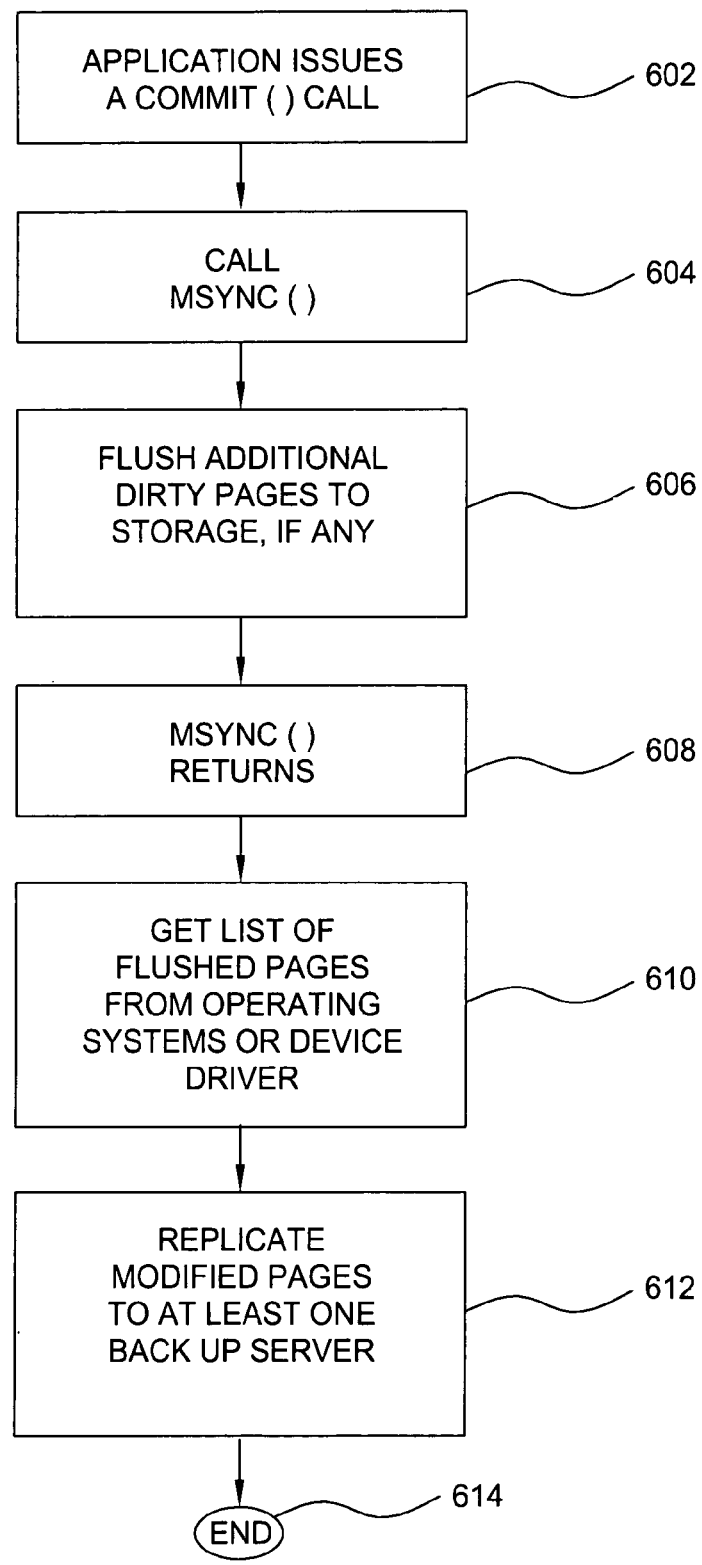
FIG. 6 depicts a flow diagram of a fourth component of a method of backing up checkpoint data in accordance with a second embodiment of the present invention.

During the execution of application software, the application may request that the checkpoint data be backed by issuing a commit ( ) call. FIG. 6 depicts a method 600 for performing a checkpoint data backup in accordance with the present invention. The method 600 forms a fourth component of the checkpoint data backup module 122. At step 602, the commit ( ) call is asynchronously issued by an application. Since the list of dirty pages is continuously updated, the application can issue a commit ( ) call at anytime to initiate the backup process for the checkpointed data. Such a call, in accordance with the present invention and in a manner that is completely transparent to the application, will cause the modified pages of checkpoint data to be backed up without backing up all of the checkpoint data.

At step 604, the commit ( ) call will issue an msync ( ) call. The msync ( ) call ensures that all the dirty pages that have not been flushed to secondary storage are now flushed, i.e., since the last execution of method 500, additional dirty pages may have been created but not yet flushed. Step 606, in essence, performs steps 506, 508, and 10 to flush the modified pages, if any, and create a list of the flushed pages. At step 608, the msync ( ) call returns. The method 600, at step 610, retrieves a list of the flushed pages from the operating system or device driver that performed the flush operation. The list now contains the flushed pages from both steps 606 and 506/508/510. At step 612, the flushed pages on the list are replicated to at least one backup server to achieve a backup of the modified pages of checkpoint data. At step 612 the method 600 replicates the flushed modified pages to at least one backup server as described above. For example, the replication may be performed in accordance with the method described in U.S. patent application Ser. No. 10/812,139, filed Mar. 39, 2004, and incorporated herein by reference. At step 614, the method 600 ends.

The file system need not be accurate in tracking the modified portions of the memory, e.g. pages or blocks. False positive identifications of modified blocks is not detrimental to operation of the backup process. If necessary, the method 600 could compare the old and new data and identify the false positive pages or blocks. This comparison can be facilitated by maintaining a copy of the entire distributed shared memory (DSM) that stores the checkpoint data. Before replication, the old version of stored data is compared to the current DSM and the method replicates only the pages that are different. An alternative method of mitigating false positives is to maintain a hash value for each page in the old DSM copy. Before replicating a page in the current DSM, a hash value for the recent page is generated and compared to the hash value of an old page. If the hash values differ, then replicate the page; otherwise, do not replicate the page. Each page in the current DSM can be hashed and compared in this manner.

As an alternative to using the file system in methods 400, 500 and 600 to identify and flush modified pages, a device driver could be used. The device driver can be a RAM disk driver or it can be a device driver that exports data pages to a device. The driver is given a write( ) call from either the operating system (asynchronous daemon context of step 508) or from an msync( ) call being processed (such as step 606). The call to the driver enables the driver to track each write access and identify the modified blocks associated with each write( ) call that it receives.

The invention provides a method and apparatus for performing a backup of checkpoint data, using a File System or device driver to track the modified data, such that only the modified pages or blocks of checkpoint data are backed up. Various procedures may be used to identify the portions (e.g., pages or blocks) of memory that have been modified since the prior backup. Some of the available procedures have been disclosed herein. Those skilled in the art may identify a number of other such procedures that would be considered within the scope of the present invention. The invention reduces the time necessary to create a backup of checkpoint data and reduces the amount of storage that is used by the backup. Furthermore, the invention performs the checkpoint data backup without interaction with the application programs executing on the production server. As such, the backup process of the present invention is transparent to the application program.

While the foregoing is directed to embodiments of the present invention, other and further embodiments of the invention may be devised without departing from the basic scope thereof, and the scope thereof is determined by the claims that follow.

What is claimed is:

1. A method comprising:
accessing checkpoint data;
mapping the checkpoint data to a memory region;
initiating a backup of the checkpoint data, wherein
    the initiating is performed after an initial backup of the checkpoint data has been performed;
in response to the initiating, identifying data stored in at least one portion of the memory region, wherein
    the data stored in the at least one portion of the memory region has been modified since the initial backup of the checkpoint data;
copying the data stored in the at least one portion of the memory region; and
replicating the data stored in the at least one portion of the memory region to at least one backup server.

2. The method of claim 1, wherein the at least one portion of the memory region comprises a memory page.

3. The method of claim 1, wherein the at least one portion of the memory region comprises a memory block.

4. The method of claim 1, further comprising:
monitoring one or more parameters associated with the memory region, wherein
    the one or more parameters indicate whether a portion of the memory region has been modified.

5. The method of claim 1, further comprising:
monitoring page-dirty bits to identify modified portions of the memory region.

6. The method of claim 1, further comprising:
setting all portions of the memory region to read only;
tracking faults that occur each time a write request is executed for a portion of the memory region; and
identifying portions having faults as modified portions.

7. The method of claim 1, further comprising:
tracking portions of memory that are being flushed by an operating system; and
identifying the portions as modified portions.

8. The method of claim 1, wherein the memory region is at least one of a file or an operating system device.

9. A system comprising:
one or more processors;
memory coupled to the one or more processors, wherein the memory stores program instructions executable by the one or more processors to:
    access checkpoint data,
    map the checkpoint data to a memory region,
    initiate a backup of the checkpoint data, wherein
        the backup of the checkpoint data is initiated after an initial backup of the checkpoint data has been performed,
    identify data stored in at least one portion of the memory region, in response to initiating the backup of the checkpoint data, wherein
        the data stored in the at least one portion of the memory region has been modified since the initial backup of the checkpoint data,
    copy the data stored in the at least one portion of the memory region, and
    replicate the data stored in the at least one portion of the memory region to at least one backup server.

10. The system of claim 9, wherein the at least one portion of the memory region comprises at least one of a memory page and a memory block.

11. The system of claim 9, wherein the program instructions are further executable to:
monitor one or more parameters associated with the memory region, wherein
    the one or more parameters indicate whether a portion of the memory region has been modified.

12. The system of claim 9, wherein the program instructions are further executable to:
monitor page-dirty bits to identify modified portions of the memory region.

13. The system of claim 9, wherein the program instructions are further executable to:
set all portions of the memory region to read only;
track faults that occur each time a write request is executed for a portion of the memory region; and
identify portions having faults as modified portions.

14. The system of claim 9, wherein the program instructions are further executable to:
track portions of memory that are being flushed by an operating system; and
identify the portions as modified portions.

15. A computer readable storage medium comprising program instructions executable to:
access checkpoint data;
map the checkpoint data to a memory region;
initiate a backup of the checkpoint data, wherein
    the backup of the checkpoint data is initiated after an initial backup of the checkpoint data has been performed;

identify data stored in at least one portion of the memory region, in response to
initiating the backup of the checkpoint data, wherein
the data stored in the at least one portion of the memory region has been modified since the initial backup of the checkpoint data;
copy the data stored in the at least one portion of the memory region; and
replicate the data stored in the at least one portion of the memory region to at least one backup server.

16. The computer readable storage medium of claim 15, wherein the at least one portion of the memory region comprises at least one of a memory page and a memory block.

17. The computer readable storage medium of claim 15, wherein the program instructions are further executable to:
monitor one or more parameters associated with the memory region, wherein
the one or more parameters indicate whether a portion of the memory region has been modified.

18. The computer readable storage medium of claim 15, wherein the program instructions are further executable to:
monitor page-dirty bits to identify modified portions of the memory region.

19. The computer readable storage medium of claim 15, wherein the program instructions are further executable to:
set all portions of the memory region to read only;
track faults that occur each time a write request is executed for a portion of the memory region; and
identify portions having faults as modified portions.

20. The computer readable storage medium of claim 15, wherein the program instructions are further executable to:
track portions of memory that are being flushed by an operating system; and
identify the portions as modified portions.

21. A method comprising:
accessing checkpoint data;
mapping the checkpoint data to a memory region;
determining at least one portion of the memory region that has been modified;
setting all portions of the memory region to read only;
tracking faults that occur each time a write request is executed for a portion of the memory region;
identifying the portions having faults as portions that are modified portions;
copying the modified portions; and
replicating the copied modified portions of the memory region comprising modified checkpoint data to at least one backup server.

* * * * *